(12) United States Patent
Zindler

(10) Patent No.: US 6,247,570 B1
(45) Date of Patent: Jun. 19, 2001

(54) FAIL-SAFE ADJUSTABLE CENTRIFUGAL CLUTCH

(76) Inventor: Hugh A. Zindler, P.O. Box 389, Blue Jay, CA (US) 92317

( * ) Notice: Subject to any disclaimer, the term of this patent is extended or adjusted under 35 U.S.C. 154(b) by 0 days.

(21) Appl. No.: 09/418,955

(22) Filed: Oct. 14, 1999

(51) Int. Cl.[7] .................................................. F16D 43/18
(52) U.S. Cl. ............................... 192/105 BA; 192/109 R
(58) Field of Search ..................... 192/105 BA, 103 B, 192/109 R

(56) References Cited

U.S. PATENT DOCUMENTS

| | | |
|---|---|---|
| 1,745,681 | 2/1930 | Lowndes . |
| 2,016,643 | 10/1935 | Lowndes . |
| 2,158,544 | 5/1939 | Keller . |
| 2,471,747 | 5/1949 | Hinden et al. . |
| 2,542,111 | 2/1951 | Eaton . |
| 2,942,711 | 6/1960 | Zindler . |
| 3,610,382 | 10/1971 | Makinson . |
| 3,810,533 | 5/1974 | Densow . |
| 3,971,463 | 7/1976 | Zindler . |
| 4,049,103 | 9/1977 | Sessler . |
| 4,253,556 | 3/1981 | Zindler . |
| 4,498,552 | 2/1985 | Rouse . |
| 4,819,779 | 4/1989 | Nickel et al. . |
| 4,903,812 | 2/1990 | Fischer et al. . |
| 5,419,421 | 5/1995 | Lohr . |
| 5,437,356 | 8/1995 | Lohr . |
| 5,560,465 | 10/1996 | Zindler . |

FOREIGN PATENT DOCUMENTS

| | | |
|---|---|---|
| 572669 | 6/1924 | (FR) . |
| 593766 | 8/1925 | (FR) . |
| 361433 | 11/1931 | (GB) . |

Primary Examiner—Richard M. Lorence
(74) Attorney, Agent, or Firm—Sheldon & Mak

(57) ABSTRACT

A centrifugal clutch having an interlocking combination of shoes and stop pins includes compression biasing springs that are adjustable with tamper-free locking, using reversible spring biased wedges that smoothly transition between selected low-gain and high gain engagements within a desired narrow speed range. The clutch also includes a hub, a rotatable drum having a circularly cylindrical inside surface, and a plurality of shoes, each shoe including a rigid metallic shoe member and a lining. A stop pin is interposed between lock portions of each adjacent pair of the shoes for blocking the shoe members from moving radially outwardly into contact with the inside surface of the drum and for preventing separation of the shoes in the event of axial disengagement or structural failure of the drum during high-speed operation of the clutch. The compression biasing springs include a plurality of stacked spring washers assembled on the stop pins with respective adjustment nuts. A wedge member having oppositely inclined wedge surfaces slides in a slot of each shoe, for torque transmission in opposite rotational directions. The wedge surfaces can be asymmetrical for facilitating adjustment of a torque-speed characteristic of the clutch.

20 Claims, 2 Drawing Sheets

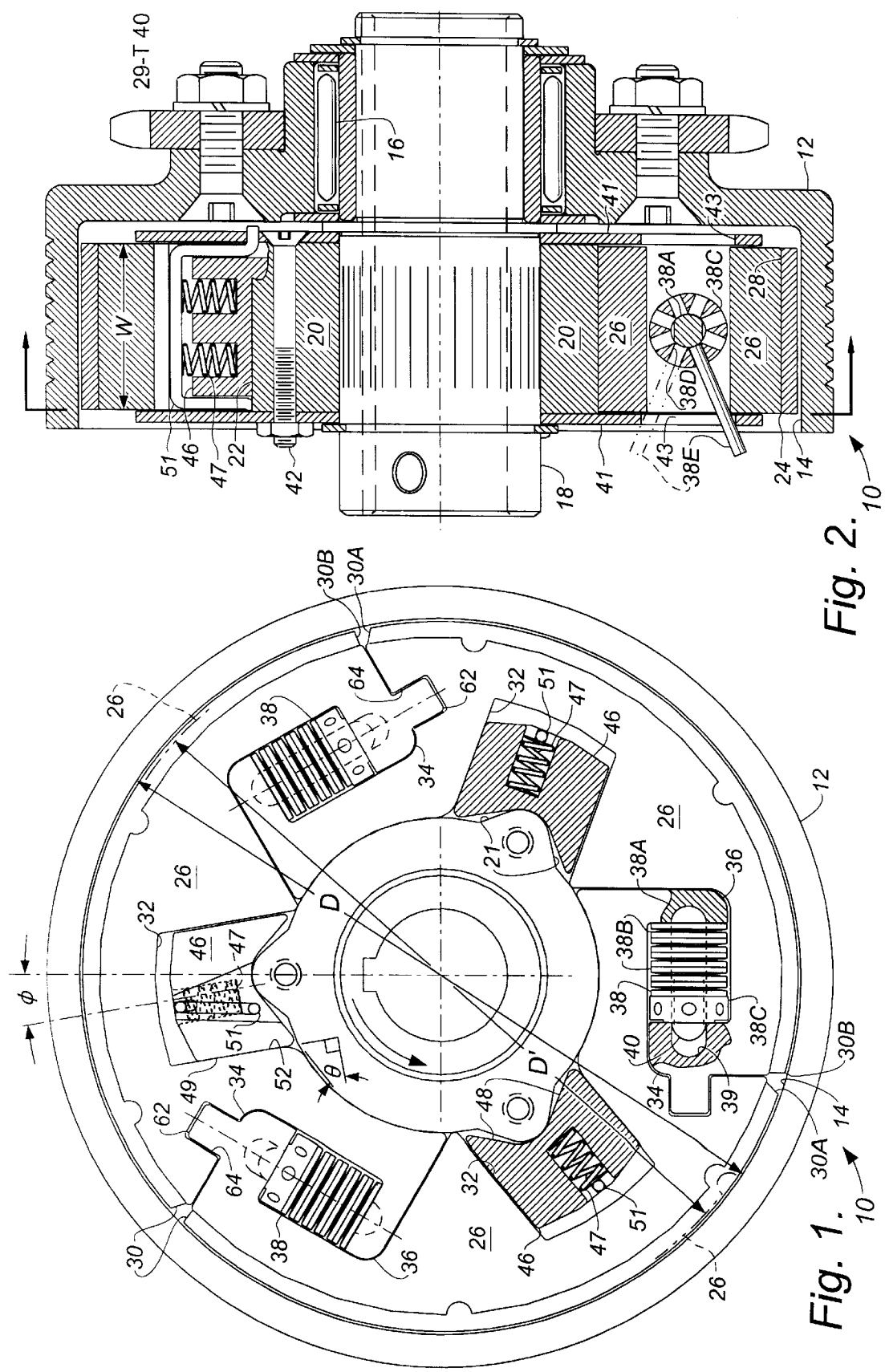

FAIL-SAFE ADJUSTABLE CENTRIFUGAL CLUTCH

BACKGROUND

The present invention relates to centrifugal clutches such as are used in light vehicles, chain saws, pumps, wind mills, compressors, engine, electric motor, wind driven products and the like for variably coupling rotational power sources to driven loads.

Centrifugal clutches are disclosed, for example in U.S. Pat. Nos. 2,942,711 and 3,971,463 to the above-named inventor, which patents are incorporated herein by this reference. Typically, a plurality of radially movable shoes frictionally contact an inside surface of a drum that rotates concentrically with a hub to which the shoes are connected. Normally, the hub is fixed on a driving shaft or face plate that is coupled to an engine or power source, the drum being coupled to a driven load by means such as a belt, chain or direct coupled drive. Such clutches transmit little or no torque at low speeds, and progressively increased torque at higher speeds in proportion to centrifugal forces to which the shoes are subjected. In the above-identified patents, spring biasing elements are employed for maintaining the clutches in a disengaged condition at speeds below a predetermined threshold for permitting the engine or other power source to idle at no load.

Centrifugal clutches as previously implemented are subject to a number of problems and disadvantages. For example:

1. They are ineffective in that they fail to provide a desired torque-speed relationship to match the characteristics of the power source;
2. They are short-lived in that there is excessive slippage and consequent wear of the shoes, particularly when there is a large vibrational component or high inertia load in the torque;
3. They are unreliable in that springs used therein are subject to breakage, particularly in that they have fatigue inducing stress risers in hooks at opposite ends;
4. They are unsafe in that the shoes can fly apart in case there is structural failure of the drum; and
5. They are undesirably expensive to produce.

The clutch as disclosed in the '711 patent can be assembled in a variety of ways to selectively provide correspondingly different torque-speed relations such as straight-centrifugal with selectable speeds of engagement; relatively quick-acting; or relatively smooth-acting. However, none of the torque-speed relations is entirely satisfactory, and there are numerous possibilities for incorrect assembly. The clutch as described in the '463 patent provides driving member projections that are successively engageable with the shoes at increasing speed increments for progressively increased torque transmission. Again, none of the torque-speed relations is entirely satisfactory, particularly when it is desired to obtain initial engagement at a high percentage of the full-load speed of the clutch, and the clutch is excessively complex and expensive to produce.

It is also known to have direct metal-to-metal contact between the drum and metal shoe members of centrifugal clutches. However, the applications for such clutches are severely limited by a lower coefficient of friction, excessive wear, and galling.

U.S. Pat. No. 5,560,465 to the present inventor discloses a centrifugal clutch having an interlocking combination of shoes and compression biasing springs for preventing separation of the shoes in the event of axial disengagement or structural failure of the drum, and a spring biased wedge that smoothly transitions between low-gain and high gain orientations within a narrow speed range. Unfortunately, the clutch described in the '465 patent is not entirely satisfactory in that the drum can become damaged by direct contact with metallic shoes in the event that lining material on the shoes is worn through. Also, desired gain-speed profiles typically desired in particular applications are difficult to obtain, particularly without requiring undesirably large inventories of variantly configured components.

Thus there is a need for a centrifugal clutch that provides desired torque-speed profiles that smoothly transition from no-load to full load in an adjustable narrow speed range, that is fail-safe against lining wear-through as well as against separation of the shoes in case of failure of the drum, and that is reliable, long-lasting, and inexpensive to produce.

SUMMARY

The present invention meets this need by providing a centrifugal clutch having an interlocking combination of shoes and stop pins, and that in its preferred implementations includes compression biasing springs that are adjustable with tamper-free locking, reversible spring biased wedges that smoothly transition between selected low-gain and high gain engagements within a desired narrow speed range. In one aspect of the invention, the clutch includes a rotatable drum having a circularly cylindrical inside surface; a plurality of shoes, each shoe including a rigid metallic shoe member and a lining having an external engagement surface for frictionally contacting the inside surface of the drum; means for coupling each shoe to a rotatable hub for rotation therewith when the hub rotates concentrically with the drum; means for permitting movement of each shoe radially inwardly and outwardly relative to the drum; each shoe having a radially inwardly projecting first lock portion and a radially outwardly projecting second lock portion circumferentially spaced from the first lock portion; and a stop pin interposed between the first and second lock portions of each adjacent pair of the shoes for blocking the shoe members from moving radially outwardly into contact with the inside surface of the drum and for preventing separation of the shoes in the event of axial disengagement or structural failure of the drum during high-speed operation of the clutch.

The compression springs can have openings therein, being located by the stop pins projecting therethrough. Preferably the compression springs each include a plurality of stacked spring washers for enhanced fatigue resistance. Preferably the stop pins have respective adjustment members assembled therewith for adjustably loading the compression springs. The adjustment members can be adjustment nuts having threaded engagement with corresponding stop pins, an end portion of each stop pin having non-circular axial engagement with a respective shoe member for preventing rotation of the stop pin during adjustment of the adjustment nut.

The means for coupling and the means for permitting can include a plurality of dogs formed on the hub; a generally radially oriented slot formed on each shoe; a wedge member slidably engaging the slot of each shoe and having a wedge surface for engagement by a corresponding one of the dogs; and a wedge spring for biasing the wedge member against the corresponding dog. Preferably each wedge member is formed with an oppositely inclined pair of the wedge surfaces, the clutch being operable with torque transmission in opposite rotational directions, each of the dogs engaging one of the oppositely inclined wedge surfaces in one direction of transmitted torque and the other of the wedge surfaces during torque transmission in an opposite direction. Also, the oppositely inclined wedge surfaces can be asymmetrical, a torque-speed characteristic of the clutch being adjustable by selectively reversing the wedge members in the respective slots. The respective slots can be inclined at an angle of approximately 10 degrees from being radially oriented with corresponding ones of the dogs. Preferably the clutch can further include a plurality of keeper members, each keeper member being pivotally located relative to the hub for limiting outward movement of a respective wedge member.

Preferably the clutch further includes a guide on each shoe for circumferentially engaging an adjacent shoe, thereby radially stabilizing the shoes relative to the drum. Each guide can be formed by a pair of facing parallel-spaced guide surfaces extending from proximate one of the contact extremities of the respective shoe, a tongue portion of each shoe extending from the other of the contact extremities into engagement with the guide surfaces of the adjacent shoe. The guide surfaces of each shoe can extend from the leading contact extremity, the tongue portion extending from the trailing contact extremity. Preferably the guides have locating contact with the adjacent shoes proximate opposite side extremities of the shoes for enhanced stabilization of the shoes against lateral tipping.

The inside surface can have a diameter of approximately 6 inches, the locking of the shoes by the lock portions of the shoe members preferably being effective at rotational speeds of at least 3000 RPM. The shoe members can each have an overall width, the lock portions of the shoe members each preferably extending solidly over the overall width for enhanced stability of the shoes.

The clutch of the present invention provides smooth shock-free load pick up without chatter or wear. The capacity increase from low torque to high torque is in the range of 500%. The combination including the stop pins allows non-fatiguing springs to be used, resulting in extended life. A fail-safe configuration prevents operation beyond approximately 95% of lining wear. The design of the clutch is notably versatile, resulting in significantly reduced tooling costs while serving a wide variety of applications. Also, the clutch is readily matched more precisely with particular power sources (which can be reciprocating diesel or gasoline engines, turbines, or electric motors) and loads than heretofore possible, resulting in longer life for both the power source and the driven mechanism (such as a compressor, pump, auger, or powered vehicle). The clutch, which incorporates the best features of low-torque, straight centrifugal, and high-torque configurations, is capable of transmitting more torque in a smaller, more economical package than existing clutches.

The clutch of the present invention starts with a softer torque characteristic than a conventional low-torque clutch, automatically converting with increased speed to a greater torque capacity than a conventional high-torque clutch. In a practical analogy to a car having a manual transmission, a variety of operating conditions are possible, including:

1. At start up and with the engine revved up the clutch pedal is gradually let out. A smooth get-away is accomplished, but at the expense of rapid wear and short clutch life.
2. At start-up and with the engine revved up the clutch pedal is abruptly let out, resulting in a jerky forward motion and/or stalling of the engine.

The first condition is analogous to a low-torque clutch and the second condition is analogous to a high-torque clutch. The clutch of the present invention automatically provides a short interval of low-torque operation for smooth starting, with a smooth but rapid change to a high-torque mode for achieving smooth starts without excessive wear. In summary, the clutch of the present invention exhibits a number of advantages from the perspective of a clutch manufacturer. For example:

1. It can be pre-set for optimum performance in each application;
2. There is increased customer satisfaction;
3. There are reduced warranty and liability claims;
4. Tooling and design staff requirements are reduced;
5. Both production and service inventory requirements are reduced;
6. New applications for the clutch can be serviced more quickly; and
7. Profitability extends to vast markets not now being served.

Many of the above advantages also apply to end-product manufacturers. In addition:

1. There is reduced shock to the overall system;
2. Operation is cooler, and with longer life;
3. Overall product performance can be fine-tuned, with separate speed-sensitive and torque-sensitive attributes; and
4. There is controllable over-load protection.

DRAWINGS

These and other features, aspects, and advantages of the present invention will become better understood with reference to the following description, appended claims, and accompanying drawings, where:

FIG. 1 is a sectional end view of a centrifugal clutch according to the present invention;

FIG. 2 is a sectional side view of the clutch of FIG. 1;

DESCRIPTION

Figure 4:
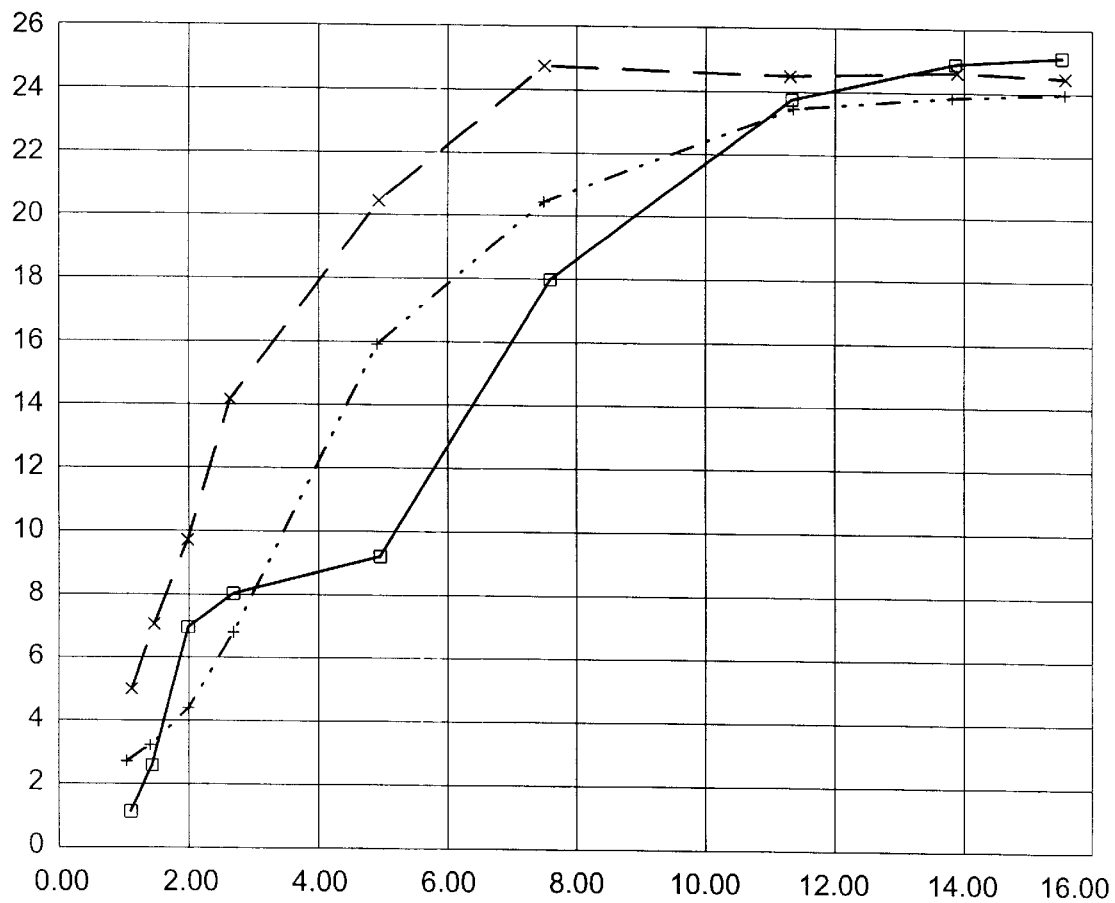
FIG. 4 is graph of clutch torque as a function of time for low torque, high torque and mode change configurations of the centrifugal clutch of FIG. 1.

The present invention is directed to a centrifugal clutch that is particularly safe, reliable, and easily configurable for smoothly transitioning from no-load to full load within a desired narrow speed range. In preferred implementations, the clutch also provides fail-safe operation wherein activation is suspended when lining wear is approximately 95% for protecting the drum from scoring. With reference to FIGS. 1 and 2 of the drawings, a centrifugal clutch 10 includes a drum 12 having a circularly cylindrical inside surface 14, the drum 12 being concentrically rotatably mounted by a needle bearing 16 to a drive shaft 18, the shaft 18 being configured for being supported and rotationally driven by conventional means (not shown), such as by being installed on an engine crank shaft. A hub 20 having tapered radially projecting dogs 22 is fixedly mounted to the shaft 18 such as by being pressed onto the shaft 18 over axially oriented serrations that are formed on the shaft, each dog 22 projecting into and engaging a respective wedge block 46 that is radially movable and circumferentially restrained relative to a corresponding shoe 24. Each shoe 24 includes a rigid shoe member 26 and a lining 28 for frictionally engaging the drum 12 whereby the torque transmission capability of the clutch 10 increases with the speed of the shaft 18. The lining 28 extends circumferentially on the shoe member 26 between a leading extremity 30A and a trailing extremity 30B of the lining 28, the extremities 30A and 30B being generically referred to as lining extremities 30. It will be understood that the shoe member 26 can be adapted for direct contact with the drum 12 in some applications, the lining 28 being omitted.

Each of the shoe members 26 is formed with a generally radially oriented drive slot 32 that is engaged by the corresponding wedge block 46. In the exemplary configuration of the clutch 10 as shown, the drive slot 32 is located circumferentially closer to the leading extremity 30A than the trailing extremity 30B of the lining 28 for producing a soft-start response of the shoes 24. The centrifugal force producing frictional engagement is proportional to the square of the rotational speed. It will be understood that locating the drive slot 32 midway between the extremities 30A and 30B provides a neutral response. Conversely, locating the drive slot 32 closer to the trailing extremity 30B provides a more rapidly progressive torque characteristic (higher gain) torque profile of the clutch 10 as described in the above-referenced U.S. Pat. No. 2,942,711. As described below, it is contemplated that the clutch 10 can be selectively assembled for high and low gain profiles by reversing the orientation of shoes 24 relative to the direction of rotation.

As disclosed in U.S. Pat. No. 5,560,465, each shoe member 26 has an inwardly projecting first lock portion 34 and a circumferentially spaced outwardly projecting second lock portion 36, with respective compression springs being interposed between corresponding lock portions 34 and 36 of adjacent shoes for biasing the shoes away from the drum 12. According to the present invention, the biasing is provided by respective spring assemblies 38, each spring assembly 38 including a calibrated stop pin 38A that rigidly stops expansion of the shoe members 26 beyond a predetermined limit diameter D' by directly abutting the lock portions 34 and 36 of adjacent shoes 24. The lock portions 34 and 36 of adjacent shoes 24 interlock to prevent separation of the shoes 24 more than a predetermined amount beyond engagement with the drum 12 (the spring assemblies 38 having maximum compression in such condition). Thus, in case of fracture of the drum 12 or axial movement thereof away from the shoes 24, the shoes 24 are advantageously retained in end-to-end engagement about the shaft 18, rather than being thrown outwardly. This is a significant advantage in that the hub 20 is likely to be rotated at speeds significantly higher than those attained by the drum 12 in case of failure of the drum 12. Also, in configurations of the clutch 10 normally having direct contact by the shoe members 26 against the drum inside surface 14, the combination of the lock portions 34 and 36 with the stop pin 38A provides an accurately determined condition of maximum allowed combined wear of the shoe members 26 and the drum inside surface 14.

Preferably the limit diameter D' is just slightly less than the drum diameter D for preventing metal-to-metal contact between the shoe members 26 and the drum 12 resulting from wear of the linings 28. More particularly, the stop pins 38A are preferably configured (calibrated) to prevent outward movement of the shoes beyond a point that would be reached when the linings 28 have worn through approximately 95 percent of their thickness. Each spring assembly 30 also includes a stack of spring washers 38B through which the stop pin 38A protrudes, and an adjustment nut 38C that threadingly engages the corresponding stop pin 38A for adjustably preloading the shoes 24 inwardly toward the hub 20. It will be understood that while other forms of compression springs are contemplated, the implementation as spring washers is preferred, such being highly resistant to fracture failure as compared with highly loaded helical compression springs. Advantageously, the travel limitation is implemented without bottoming out the spring washers 38B, resulting in spring washers 38B being even less subject to fatigue failure than in the disclosed configurations of the '465 patent.

The spring washers 38B are located by being assembled onto respective ones of the stop pins 38A, the pins 38A in turn being located by opposite ends thereof having pivotable socket-engagement with respective transversely circularly cylindrical depressions 39 that are formed in lock portions 34 and 36 of the shoe members 26. Also, opposite ends of the stop pins 38A have transversely oriented cylindrical engagement surfaces 40 that pivotally abut the depressions 39 as shown in FIG. 1 when the shoes 24 are displaced sufficiently outwardly. (Although the engagement surfaces 40 are shown circularly cylindrical, other profiles are contemplated, such as beveled. Cylindrical means having a surface that is generated by a line that moves parallel to a fixed line.) Additionally, the stop pins 38A can have a rectangular (typically square) cross-section to facilitate forming the engagement surfaces 40 on opposite ends thereof in parallel alignment as well as for preventing rotation of the stop pins 38A during adjustment of the nuts 38C. Thus the outward travel limitation of the shoe members 26 is accurately dictated by the stop pins 38A independently of both the number and thickness of the spring washers 38B and the adjustment of the nut 38C, as long as the nut 38C does not directly contact a shoe member 26. As also shown in FIG. 2, The adjustment nut 38C has a plurality of radially extending cavities 38D formed therein for engagement by a suitable adjustment tool 38E, which can be a length of commonly available drill rod.

As shown in FIG. 2, a pair of disk-shaped retainer members 41 are rigidly fastened on opposite sides of the hub 20 by a plurality of fasteners 42, the shoes 24 being slidably confined between the retainer members 41. The fasteners 42 are shown as threaded fasteners in the drawings, it being understood that rivet fasteners are alternatively contemplated. The retainer members 41 also serve to exclude contamination from the inside of the clutch 10 and for further purposes described herein. The retainer members 41 have radially extending clearance slots 43 formed therein for accessing the adjustment cavities 38D and operation of the adjustment tool 38E, the slots 43 being sufficiently large (and the cavities 38D being sufficiently closely spaced) for permitting continuous adjustment of the nuts 38C. Once a desired adjustment is achieved as described below, the adjustment can be locked by installing a lock pin (not shown) in an exposed one of the cavities 42 of each of the nuts 38C (at the location 38E depicted by broken lines in FIG. 2), each nut 38C being lockable in one of a plurality of angular positions per revolution depending on the number of the cavities 42 therein. In the exemplary configuration of FIG. 2, the shoes 24 have a width W that is approximately 2.5 inches in the illustrated exemplary configuration of the clutch 10, one of the spring assemblies 38 being laterally centrally located in space between adjacent shoe members 26, the nut 38C having eight of the cavities 38D for permitting the continuous adjustment with the tool 38E operating in space between adjacent ones of the shoe members 26. Alternatively, the springs 38 can be laterally spaced in groups of two between each adjacent pair of shoes 24, although adjustment of inboard ones of the spring assemblies 38 requires disassembly of the drum 12 from the shaft 18.

As further shown in the drawings, the dogs 22 of the hub 20 are smoothly rounded between oppositely sloping ramp surfaces 21. A wedge block 46 is interposed within the drive slot 32 between each shoe member 26 and the corresponding dog 22, the wedge block 46 having sliding engagement with the slot 32 and being biased inwardly toward the hub 20 by at least one wedge spring 47 for producing a variable gain torque characteristic of the clutch 10. More particularly, the wedge block 46 has at least one sloping wedge surface 48 that can contact the dog 22. The wedge surface 48 is inclined at an angle $\theta$ from a leading surface 49 of the wedge block 46, a normal direction of rotation of the hub 20 relative to the drum 12 being counter-clockwise as indicated by the curved arrow in FIG. 1. In the exemplary and preferred configuration shown in the drawings, the wedge block 46 has an oppositely inclined pair of the wedge surfaces, individually designated 48H and 48L, that project on opposite sides of the dog 22.

The wedge spring 47 is located within a spring cavity 50 of the block 46, being compressively loaded between the bottom of the cavity and a bail or keeper 51 that is supported by opposite ends thereof having pivotal engagement with the retainer members 41. Significantly, the keepers 51 enable the inward loading of the wedge blocks 46 by the springs 47 without producing an outward reaction against the shoes 24 as previously disclosed in the above-referenced '465 patent. Each of the drive slots 32 has a leading surface 52 and a trailing surface 54 with reference to the previously indicated curved arrow in FIG. 1, the surfaces 52 and 56 of the slot 32 being parallel. The shoes 24 can move outwardly into contact with the drum 12 while the wedge blocks 46 remain fully inwardly advanced relative to the hub 20, the wedge block 46 slidingly contacting the leading surface 52 of the drive slot 32. This condition of the clutch 10 is referred to as a threshold gain mode in the above referenced '465 patent. The threshold gain mode continues until the speed increases to a first intermediate speed at which the wedge blocks 46 begin to move outwardly relative to the hub 20 in response to centrifugal force on the wedge block 46 in combination with a radial torque load component that may be applied to the wedge block 46 by the dog 22 in response to torque loading of the clutch 10. In the threshold gain mode, the shoes 24 are driven outwardly only by centrifugal force acting on the shoes 24, and the spring assemblies 38, to the extent that these forces overcome the inward bias of the spring assemblies 38.

Figure 3:
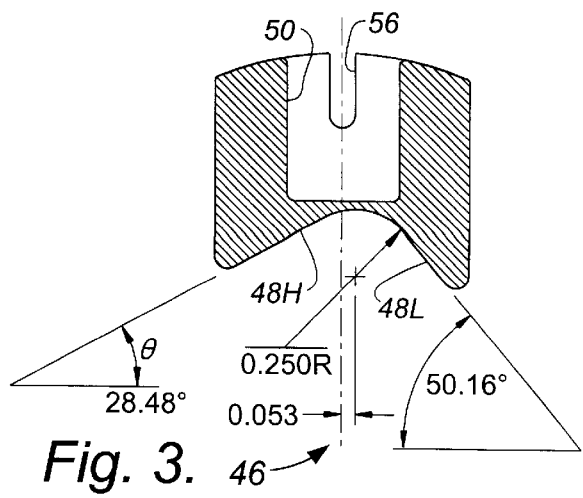
FIG. 3 is a detail sectional view of a wedge member portion of the centrifugal clutch of FIG. 1.

As shown in FIG. 3, the wedge blocks 46 have inwardly extending slots 56 formed therein, the keepers 51 entering the slots 56 as the wedge blocks 46 move outwardly (when centrifugal force in combination with the radial torque load component exceeds initial loading of the wedge springs 47). The slots 56 extend partway into the respective cavities 50 that are formed in the wedge blocks 46 for receiving the wedge springs 47.

As discussed above, the spring assemblies 38 bias the shoes 24 inwardly, away from the drum 12 for achieving a desired torque-speed characteristic, being selected and/or adjusted for providing the desired threshold speed of engagement, such as approximately 1800 RPM when the drum diameter D is on the order of 6 inches. The torque capacity increases with the centrifugal component of frictional engagement increasing proportional to the square of the rotational speed of the hub 20 as discussed in the above-referenced '465 patent.

From the first intermediate speed to a second intermediate speed, the clutch 10 operates in a first gain mode wherein the wedge blocks 46 are displaced partly outwardly within the drive slot 32 by the combination of centrifugal force and the radial component of the torque reaction imparted by the dogs 22. In the first gain mode, the shoes 24 continue to be driven outwardly by centrifugal force as offset by the loading of the spring assemblies 38 as in the threshold mode described above, until the keepers 51 reach the bottoms of the slot 56. As used herein, the threshold gain mode and the first gain mode are collectively referred to as a low gain mode.

At speeds exceeding the second intermediate speed, the wedge block 46 is fully retracted outwardly within the drive slot 32 against the keepers 51, the clutch 10 operating in a second or high gain mode wherein the shoes 24 are driven outwardly by centrifugal force on the shoes 24 and the spring assemblies 38 and in addition, a radial component of force between the wedge blocks 46 and the leading surface 52 of the drive slot 32 that results from pressure against the wedge blocks 46 from the dog 22 in transmitting torque from the drive shaft 18, and offset by the inward bias by the spring assemblies 38. In contrast with the above-referenced '465 patent, the centrifugal force on the shoes 24 does not include the mass component of the wedge blocks 46 as in the '465 patent since the wedge blocks 46 are prevented from reaching the outer ends of the drive slots 32 by the keepers 51.

As also shown in FIG. 1, the first lock portion 34 of each shoe member 26 is formed proximate the trailing extremity 30B of the respective lining 28, the second lock portion 36 being spaced beyond leading extremity 30A of the lining 28. Thus the trailing extremity 30B extends circumferentially a significantly a greater distance from the drive slot 32 than does the leading extremity 30A for stabilizing the shoes 24. As further shown in FIG. 1, a preferred configuration of the clutch 10 has adjacent ones of the shoes 24 in close sliding engagement for enhancing dynamic stability of the combination, avoiding chattering, and reducing wear. Accordingly, each shoe member 26 has a guide tongue 62 extending from the first lock portion 34 and slidably engaging a guide slot 64 of the adjacent shoe member 26 as described in the above-referenced '465 patent.

The clutch 10 of the present invention thus provides a particularly advantageous combination of soft start and high gain that provides a high capacity in a relatively small package. The automatic shifting between the low and high gain modes is bidirectional in the sense that the clutch 10 also provides protection against excessive overloading of the power source in that the low gain mode is entered almost immediately upon the occurrence of a blockage of a pump, for example, and although the clutch 10 might eventually overheat, the more expensive pump and engine are protected by the clutch 10 from damage that might otherwise occur. In addition, the bidirectionality extends to operating the clutch in reverse (opposite to the direction of the curved arrow in FIG. 1) in that the wedge blocks 46 have the oppositely inclined wedge surfaces 48. It will be understood that the additional wedge surface 48 can be inclined appropriately for achieving a desired torque-speed characteristic when operating with reverse rotation. Alternatively, the wedge surfaces 48 can be inclined differently relative to the wedge blocks 46 for facilitating adjustment of the torque-speed relation in a normal direction of rotation by selectively reversing the orientation of the wedge blocks 46 in the drive slots 32.

In a further improvement of the clutch 10, the drive slots 32 are inclined at an angle φ from being radially oriented relative to the dogs 22 when the wedge blocks 46 are fully inwardly advanced against the dogs 22, the angle φ being approximately 10 degrees.

A series of tests were performed during development of the clutch 10 in order to verify and refine the operation thereof. In order to facilitating of the results, embodiments of the clutch 10 modified to be locked in low torque and high torque modes were tested in addition to the inventive mode changing configuration. In the low torque case, the wedge blocks 46 were fixedly joined to the hub 20; in the high torque mode, the wedge blocks 46 were fixedly advanced fully outwardly in the drive slots 32. In one test wherein the angle θ was approximately 37.5 degrees, the clutch 10 was operated in a set up driven by an engine of approximately 20 horsepower and accelerating a load. In this preliminary test, the clutch having the mode changing configuration was observed to exhibit the mode change from low gain to high gain modes at only about 2.5 seconds into the run and having a capacity of 18.34 foot pounds at the end of the run as compared with 19.08 foot pounds that was obtained with the counterpart high torque clutch. In subsequent tests, the angle θ was decreased by approximately 12 degrees to approximately 25.5 degrees.

Data for these tests, listed below in Table I, was obtained under computer control, whereby a series of engine RPM, dynamometer RPM, torque. As before, three clutches were tested: a low-torque clutch, a high-torque, and the mode-change clutch. All three clutches had identical drums, shoes, spring assemblies, and spring settings. The low-torque and High-torque clutches were tested using a conventional solid driving hub and were assembled respectively in low and high torque configurations. The mode-change clutch included the driving hub 20 described above with the wedge blocks 46 and wedge springs 47. Each clutch was tested with the same dynamometer load for approximately the same interval of time, that is 30 to 31 seconds. The engine speed was gradually brought up to approximately 3500 RPM and gradually decreased. The circled numbers in the Key columns are selectively located for approximately coincident time intervals in the respective tests. The data for those nine time intervals is summarized together with the corresponding times in Table II, below, and plotted in FIG. 4. With the angle θ being 25.5 degrees, a marked improvement in the results occurred. For example, the change from low to high gain modes did not occur until approximately 5 seconds into the run advantageously corresponding to lighter engine loading during acceleration of loads in practical applications. Also, the torque capacity of the clutch increased to 25.11 foot pounds, which was more than the 24.47 that attained with the high torque clutch at the high end of the power curve. Interestingly, the mode change clutch capacity was still climbing at the high end, whereas the high torque clutch's capacity had long since begun to fall off. Of particular advantage is that the majority of slippage of the mode change clutch of the present invention occurs at the low end of the power curve (a low energy state), and as a result there is minimal heating, a factor which extends clutch life.

TABLE 1

Sample Computer/Dyno Readouts

| Low-Torque-Clutch | | | | High-Torque-Clutch | | | | Mode-Change-Clutch | | | |
|---|---|---|---|---|---|---|---|---|---|---|---|
| KEY | | | | KEY | | | | KEY | | | |
| ① | 443 | 3056 | 2.73 | ① | 810 | 3304 | 5.00 | ① | 218 | 300 | 1.13 |
|  | 467 | 3085 | 2.88 |  | 910 | 3287 | 5.79 |  | 233 | 3108 | 1.18 |
|  | 490 | 3115 | 3.05 |  | 988 | 3297 | 6.50 |  | 322 | 3122 | 1.65 |
| ② | 506 | 3126 | 3.17 | ② | 1060 | 3299 | 7.06 | ② | 496 | 3125 | 2.60 |
|  | 517 | 3131 | 3.21 |  | 1132 | 3298 | 7.75 |  | 707 | 3137 | 3.94 |
|  | 533 | 3145 | 3.41 |  | 1203 | 3297 | 8.48 |  | 852 | 3135 | 5.00 |
|  | 566 | 3174 | 3.62 |  | 1268 | 3300 | 9.05 |  | 948 | 3147 | 5.75 |
|  | 614 | 3196 | 3.98 |  |  |  |  |  | 1019 | 3149 | 6.35 |
| ③ | 662 | 3204 | 4.38 | ③ | 1332 | 3305 | 9.72 | ③ | 1091 | 3157 | 6.98 |
|  | 720 | 3222 | 4.87 |  | 1446 | 3300 | 10.88 |  | 1122 | 3156 | 7.23 |
|  | 764 | 3238 | 5.22 |  | 1505 | 3305 | 11.55 |  | 1150 | 3159 | 7.46 |
|  | 815 | 3246 | 5.63 |  |  |  |  |  | 1175 | 3166 | 7.70 |
|  | 875 | 3223 | 6.14 |  | 1661 | 3300 | 13.28 |  | 1193 | 3167 | 7.85 |
|  | 912 | 3260 | 6.47 |  | 1701 | 3301 | 13.67 |  | 1203 | 3167 | 7.94 |
| ④ | 955 | 3251 | 6.82 | ④ | 1735 | 3302 | 14.16 | ④ | 1212 | 3166 | 8.03 |
| ⑤ | 1779 | 3320 | 15.93 | ⑤ | 2243 | 3302 | 20.43 | ⑤ | 1347 | 3256 | 9.23 |
|  | 1785 | 3329 | 15.97 |  | 2257 | 3302 | 20.50 |  | 1347 | 3260 | 9.19 |
|  | 1786 | 3332 | 15.94 |  | 2269 | 3301 | 20.66 |  | 1349 | 3259 | 9.23 |
|  | 1804 | 3322 | 16.18 |  | 2281 | 3308 | 20.89 |  | 1353 | 3261 | 9.27 |
| ⑥ | 2142 | 3383 | 20.43 | ⑥ | 2605 | 3288 | 24.76 | ⑥ | 2189 | 3253 | 17.98 |
|  | 2166 | 3385 | 20.73 |  | 2600 | 3286 | 24.65 |  | 2153 | 3252 | 18.57 |
|  | 2186 | 3390 | 20.98 |  | 2594 | 3284 | 24.50 |  | 2179 | 3238 | 18.97 |
|  | 2211 | 3390 | 21.30 |  | 2596 | 3283 | 24.49 |  | 2196 | 3237 | 19.17 |
|  |  |  |  |  | 2591 | 3280 | 24.53 |  | 2223 | 3243 | 19.54 |
|  |  |  |  |  |  |  |  |  | 2253 | 2141 | 19.95 |
|  | 2459 | 3409 | 23.47 |  | 2639 | 3273 | 24.34 |  |  |  |  |
| ⑦ | 2461 | 3399 | 23.48 | ⑦ | 2644 | 3281 | 24.48 | ⑦ | 2534 | 3214 | 23.74 |
|  | 2467 | 3401 | 23.51 |  | 2654 | 3290 | 24.50 |  | 2529 | 3214 | 23.62 |
|  | 2469 | 3402 | 23.52 |  | 2644 | 3282 | 24.36 |  | 2515 | 3216 | 23.35 |
|  |  |  |  |  | 2652 | 3271 | 24.53 |  | 2519 | 3221 | 23.53 |
|  | 2530 | 3408 | 23.75 |  | 2661 | 3271 | 24.70 |  | 2537 | 3220 | 23.71 |
|  | 2534 | 3408 | 23.79 |  |  |  |  |  |  |  |  |

TABLE 1-continued

Sample Computer/Dyno Readouts

| Low-Torque-Clutch | | | | High-Torque-Clutch | | | | Mode-Change-Clutch | | | |
|---|---|---|---|---|---|---|---|---|---|---|---|
| KEY | | | | KEY | | | | KEY | | | |
| ⑧ | 2536 | 3407 | 23.85 | ⑧ | 2684 | 3281 | 24.63 | ⑧ | 2635 | 3209 | 24.91 |
| | 2539 | 3406 | 23.77 | | 2679 | 3277 | 24.45 | | 2607 | 3210 | 24.36 |
| | 2542 | 3406 | 23.84 | | | | | | | | |
| | 2556 | 3407 | 23.60 | | | | | | | | |
| ⑨ | 2554 | 3408 | 23.47 | ⑨ | 2698 | 3281 | 24.47 | ⑨ | 2655 | 3209 | 25.12 |
| | 2557 | 3407 | 23.53 | | 2705 | 3276 | 24.73 | | 2662 | 3206 | 25.11 |
| | 2561 | 3407 | 23.54 | | 2710 | 3282 | 24.65 | | 2648 | 3206 | 24.86 |
| | 2566 | 3407 | 23.59 | | 2698 | 3283 | 24.43 | | 2640 | 3205 | 24.74 |
| | 2572 | 3407 | 23.59 | | 2704 | 3276 | 24.56 | | 2644 | 3203 | 24.90 |
| | 2577 | 3405 | 23.62 | | 2700 | 3282 | 24.47 | | 2654 | 3202 | 24.84 |
| | 2584 | 3407 | 23.65 | | 2700 | 3276 | 24.40 | | 2656 | 3201 | 25.05 |
| | 2588 | 3407 | 23.71 | | 2700 | 3276 | 24.49 | | 2653 | 3202 | 24.87 |

TABLE II

Time-Correlated Subset of Test Data

| LOW TORQUE CLUTCH DESIGN | | | | | | HIGH TORQUE CLUTCH DESIGN | | | | | | AUTOMATIC LOW TO HIGH MODE CHANGE CLUTCH DESIGN | | | | | | |
|---|---|---|---|---|---|---|---|---|---|---|---|---|---|---|---|---|---|---|
| TIME SEC. | ENG. RPM | DY-NO. RPM | % SLIP | TORQ. Ft Lbs | LINE | TIME SEC. | ENG. RPM | DY-NO. RPM | % SLIP | TORQ. Ft Lbs | LINE | TIME SEC. | ENG. RPM | DY-NO. RPM | % SLIP | TORQ. Ft Lbs | LINE | KEY |
| 1.05 | 3056 | 443 | 86% | 2.73 | 9 | 1.12 | 3304 | 810 | 75% | 5.00 | 10 | 1.10 | 3090 | 218 | 93% | 1.13 | 10 | ① |
| 1.40 | 3126 | 506 | 83% | 3.17 | 12 | 1.47 | 3299 | 1060 | 68% | 7.06 | 13 | 1.43 | 3125 | 496 | 84% | 2.60 | 13 | ② |
| 1.99 | 3204 | 662 | 79% | 4.38 | 17 | 1.90 | 3305 | 1332 | 60% | 9.72 | 11 | 1.98 | 3157 | 1.91 | 65% | 6.98 | 18 | ③ |
| 2.69 | 3271 | 955 | 71% | 6.82 | 23 | 2.69 | 3302 | 1735 | 47% | 14.16 | 24 | 2.64 | 3166 | 1212 | 62% | 8.03 | 24 | ④ |
| 4.91 | 3320 | 1779 | 46% | 15.93 | 43 | 4.93 | 3302 | 2243 | 32% | 20.43 | 44 | 4.95 | 3256 | 1347 | 59% | 9.23 | 45 | ⑤ |
| 7.49 | 3383 | 2142 | 37% | 20.43 | 64 | 7.50 | 3288 | 2605 | 21% | 24.76 | 67 | 7.59 | 3253 | 2109 | 35% | 17.98 | 69 | ⑥ |
| 11.35 | 3399 | 2461 | 28% | 3248 | 97 | 11.31 | 3281 | 2644 | 19% | 24.48 | 101 | 11.33 | 3214 | 2534 | 21% | 32.74 | 103 | ⑦ |
| 13.81 | 3407 | 2536 | 26% | 23.85 | 118 | 13.89 | 3281 | 2684 | 18% | 24.63 | 124 | 13.86 | 3209 | 2635 | 18% | 24.91 | 126 | ⑧ |
| 15.56 | 3408 | 2554 | 25% | 23.47 | 133 | 15.57 | 3281 | 2698 | 18% | 24.47 | 139 | 15.51 | 3209 | 2655 | 17% | 25.12 | 141 | ⑨ |

Although the present invention has been described in considerable detail with reference to certain preferred versions thereof, other versions are possible. For example, the linings 28 can be omitted as discussed above. Also, the angle θ can be selected for greater or lesser energizing of the clutch 10. The diameter D can be selected according to the application aver a wide range such as from 1.125 inch up to more than 6 feet. Operating speeds can range from less than 500 RPM to over 10,000 RPM. Therefore, the spirit and scope of the appended claims should not necessarily be limited to the description of the preferred versions contained herein.

What is claimed is:

1. A centrifugal clutch comprising:
   (a) a rotatable drum having a circularly cylindrical inside surface;
   (b) a plurality of shoes, each shoe including a rigid metallic shoe member and a lining bonded thereto, the shoe having a leading contact extremity and a trailing contact extremity, an external engagement surface of the lining extending between the contact extremities for frictionally contacting the inside surface of the drum;
   (c) means for coupling each shoe to a rotatable hub for rotation therewith when the hub rotates concentrically with the drum;
   (d) means for permitting movement of each shoe radially inwardly and outwardly relative to the drum;
   (e) each shoe member having a radially inwardly projecting first lock portion and a radially outwardly projecting second lock portion circumferentially spaced from the first lock portion;
   (f) a plurality of compression springs, at least one of the compression springs being positioned for compression between the first and second lock portions of adjacent ones of the shoes for biasing the shoes in a direction radially inwardly from the inside surface of the drum; and
   (g) a plurality of stop pins interposed between the first and second lock portions of each adjacent pair of the shoe members and locking the shoe members from moving radially outwardly more than a predetermined distance relative to the inside surface of the drum for preventing contact between the shoe members and the drum resulting from wear of the linings, and for blocking the shoe members from moving radially outwardly into contact with the inside surface of the drum and for preventing separation of the shoes in the event of axial disengagement or structural failure of the drum during high-speed operation of the clutch.

2. The clutch of claim 1, wherein the compression springs have openings therein, being located by the stop pins projecting therethrough.

3. The clutch of claim 2, wherein the compression springs each include a plurality of stacked spring washers.

4. The clutch of claim 2, wherein the stop pins have respective adjustment members assembled therewith for adjustably loading the compression springs.

5. The clutch of claim 4, wherein the adjustment members are adjustment nuts having threaded engagement with corresponding stop pins, an end portion of each stop pin having non-circular axial engagement with a respective shoe member for preventing rotation of the stop pin during adjustment of the adjustment nut.

6. The clutch of claim 1, wherein the means for coupling and the means for permitting comprise:
 (a) a plurality of dogs formed on the hub;
 (b) a generally radially oriented slot formed on each shoe;
 (c) a wedge member slidably engaging the slot of each shoe and having a wedge surface for engagement by a corresponding one of the dogs; and
 (d) a wedge spring for biasing the wedge member against the corresponding dog.

7. The clutch of claim 6, wherein each wedge member is formed with an oppositely inclined pair of the wedge surfaces.

8. The clutch of claim 7, wherein the clutch is operable with torque transmission in opposite rotational directions, each of the dogs engaging one of the oppositely inclined wedge surfaces in one direction of transmitted torque and the other of the wedge surfaces during torque transmission in an opposite direction.

9. The clutch of claim 7, wherein the oppositely inclined wedge surfaces are asymmetrical, a torque-speed characteristic of the clutch being adjustable by selectively reversing the wedge members in the respective slots.

10. The clutch of claim 6, wherein the respective slots are inclined at an angle of approximately 10 degrees from being radially oriented with corresponding ones of the dogs when the wedge blocks are advanced fully inwardly.

11. The clutch of claim 6, further comprising a plurality of keeper members, each keeper member being pivotally located relative to the hub for limiting outward movement of a respective wedge member.

12. The clutch of claim 1, further comprising a guide rigidly positioned on each shoe member for circumferentially engaging an adjacent shoe member, thereby radially stabilizing the shoes relative to the drum.

13. The clutch of claim 12, wherein each guide is formed by a pair of facing parallel-spaced guide surfaces integrally extending from circumferentially proximate one of the contact extremities of the respective shoe, a tongue portion of each shoe rigidly extending from circumferentially proximate the other of the contact extremities into engagement with the guide surfaces of the adjacent shoe.

14. The clutch of claim 13, wherein the guide surfaces of each shoe extend from circumferentially proximate the leading contact extremity, the tongue portion extending from circumferentially proximate the trailing contact extremity.

15. The clutch of claim 13, wherein the guide surfaces are formed with a clearance of not more than approximately 0.005 inch over the respective tongue portions.

16. The clutch of claim 12, wherein the shoe members each have an overall width, and the guides have locating contact with the adjacent shoes proximate opposite side extremities of the shoes.

17. The clutch of claim 1, wherein the inside surface has a diameter of approximately 6 inches, and the locking of the shoes by the lock portions of the shoe members is effective at rotational speeds of at least 3000 RPM.

18. The clutch of claim 1, wherein the shoe members each have an overall width, and the lock portions of the shoe members each extend solidly over the overall width.

19. A centrifugal clutch comprising:
 (a) a rotatable drum having a circularly cylindrical inside surface;
 (b) a plurality of rigid shoes, each shoe having a leading contact extremity and a trailing contact extremity, an external engagement surface of the shoe extending between the contact extremities for frictionally contacting the inside surface of the drum;
 (c) means for coupling each shoe to a rotatable hub for rotation therewith when the hub rotates concentrically with the drum;
 (d) means for permitting movement of each shoe radially inwardly and outwardly relative to the drum, wherein the means for coupling and the means for permitting comprise:
  (i) a plurality of dogs formed on the hub;
  (ii) a generally radially oriented slot formed on each shoe;
  (iii) a wedge member slidably engaging the slot of each shoe and having an oppositely inclined pair of the wedge surfaces for engagement by a corresponding one of the dogs; and
  (iv) a wedge spring for biasing the wedge member against the corresponding dog; and
 (e) a plurality of springs for biasing the shoes in a direction radially inwardly from the inside surface of the drum.

20. A centrifugal clutch comprising:
 (a) a rotatable drum having a circularly cylindrical inside surface;
 (b) a plurality of rigid shoes, each shoe having a leading contact extremity and a trailing contact extremity, an external engagement surface of the shoe extending between the contact extremities for frictionally contacting the inside surface of the drum;
 (c) means for coupling each shoe to a rotatable hub for rotation therewith when the hub rotates concentrically with the drum;
 (d) means for permitting movement of each shoe radially inwardly and outwardly relative to the drum, wherein the means for coupling and the means for permitting comprise:
  (i) a plurality of dogs formed on the hub;
  (ii) a generally radially oriented slot formed on each shoe;
  (iii) a wedge member slidably engaging the slot of each shoe and having a wedge surface for engagement by a corresponding one of the dogs; and
  (iv) a wedge spring for biasing the wedge member against the corresponding dog;
 (e) a plurality of compression springs, at least one of the compression springs being positioned for compression between the first and second lock portions of adjacent ones of the shoes for biasing the shoes in a direction radially inwardly from the inside surface of the drum; and
 (f) a plurality of keeper members, each keeper member being pivotally located relative to the hub for limiting outward movement of a respective wedge member.

* * * * *